UNITED STATES PATENT OFFICE.

CHARLES BAER AND JOHN GOULIART, OF BALTIMORE, MARYLAND.

IMPROVEMENT IN MAKING MANURE.

Specification forming part of Letters Patent No. 3,139, dated June 24, 1843.

*To all whom it may concern:*

Be it known that we, CHARLES BAER and JOHN GOULIART, of the city of Baltimore, in the State of Maryland, have invented certain new and useful Improvements in the Manner of Making Manure which has been for many years practiced in France, and has been there secured by Letters Patent under the name of " La Methode Jauffret;" and we do hereby declare that the following is a full and exact description thereof.

In the method of Mr. Jauffret a pit or reservoir is prepared of sufficient size to contain the quantity of prepared lye which may be required by the nature of the establishment. This reservoir or vat is intended to be a receptacle of water saturated with decomposed animal and vegetable matters, and is further to receive the ingredients hereinafter named. Such water is to be found on nearly every farm, and it may be augmented by the drainings of stables, by dish-water, suds, and other substances of a like nature. Mr. Jauffret, however, finally prepares his lye by which the fermentation of the articles to be converted into manure is to be promoted in the following manner, under various modifications:

For the conversion of from one to two thousand pounds of vegetable matter into manure he takes about two hundred pounds of nightsoil; two hundred pounds of calcined plaster, in powder; fifty pounds of wood-soot; twenty pounds of wood-ashes, unleached; sixty pounds of quicklime; one pound of common salt; one pound of rough saltpeter; one hundred and fifty pounds of lye or ferment draining from a Jauffret manure heap. These ingredients are in many cases to be replaced by others; this lye to be prepared ten or fifteen days before use.

The quantity of materials above named for the conversion of from one to two thousand pounds of straw or other dry vegetable stalks will answer for about double that quantity of green vegetable matter.

In using this lye the plan of Mr. Jauffret is to steep in it the vegetable fibers which are to be acted upon by throwing them into the vat or reservoir containing it and removing them thence at great labor, so as to form a high heap in the vicinity of the vat, into which the drainings are allowed to run.

We have thus given a brief outline of the method of Mr. Jauffret, the same appearing necessary to the understanding of our improvements, which consist in our omitting altogether the excessive labor of steeping the materials to be acted upon in the lye and elevating them from thence to the heap, and also in the preparation of a lye which is equally effective with that of Jauffret at much less cost, and which can be used immediately on its being made, thereby saving the delay of ten or fifteen days which La Methode Jauffret requires.

We prepare a reservoir to contain the lye, as usual, and in the immediate vicinity of this we make our stacks or heaps of vegetable matter which is to be converted into manure. We give to the ground where the heap or pile is to be made an inclination toward the vat. If the ground is a firm clay, it may be merely sloped and have shallow trenches dug on its surface to conduct the drainings back into the vat, or it may have a flooring of timber, brick, or stone, as may be preferred, which may be so trenched as to conduct the whole toward a central drain. When our platform or flooring is of clay we cover the trenches and whole surface of it with brush-wood or rails, so as to form a temporary grating that will support the weight of the heap, and thus insure a drainage and the admission of air to the heap from below. The materials to be converted into manure we pile upon this prepared platform immediately as it is delivered by the carts, and this we sometimes continue to do until the heap has attained the whole height to be given to it, when by the use of a pump, buckets, or other suitable means we raise the lye from the vat and pour it onto the heap, continuing so to do until the whole mass is saturated. We in general, however, raise the heap to a height of two, three, or four feet, more or less, and then pour on a portion of lye, repeating this as the height of the pile is increased. This procedure obviates the necessity of lifting the whole of the lye to the full height of the heap.

The material which we employ in making the lye may be limited to the following, namely: cow, horse, or hogs' dung, or night-soil, the urine draining from stables, and quicklime, the ingredients used to be intimately mixed with a sufficient quantity of saturated water.

Two of the kinds of animal-dung we have found to answer as well as a larger number. A perfectly good lye will be made by taking one barrel each of two of the species of dung, two of the urinary drainings, one of quicklime, and about fifty barrels of saturated water, which is then to be used as above explained.

What we claim as our improvement on Jauffret's method of forming manure by the rapid fermentation of vegetable fibers is—

The forming of the said vegetable matter into piles or heaps without its being first immersed in the prepared lye, and then subsequently saturating the same by the pouring on the lye, in the manner set forth.

CHARLES BAER.
JOHN GOULIART.

Witnesses:
TH. M. ABBETT,
J. R. ABBETT.